United States Patent Office

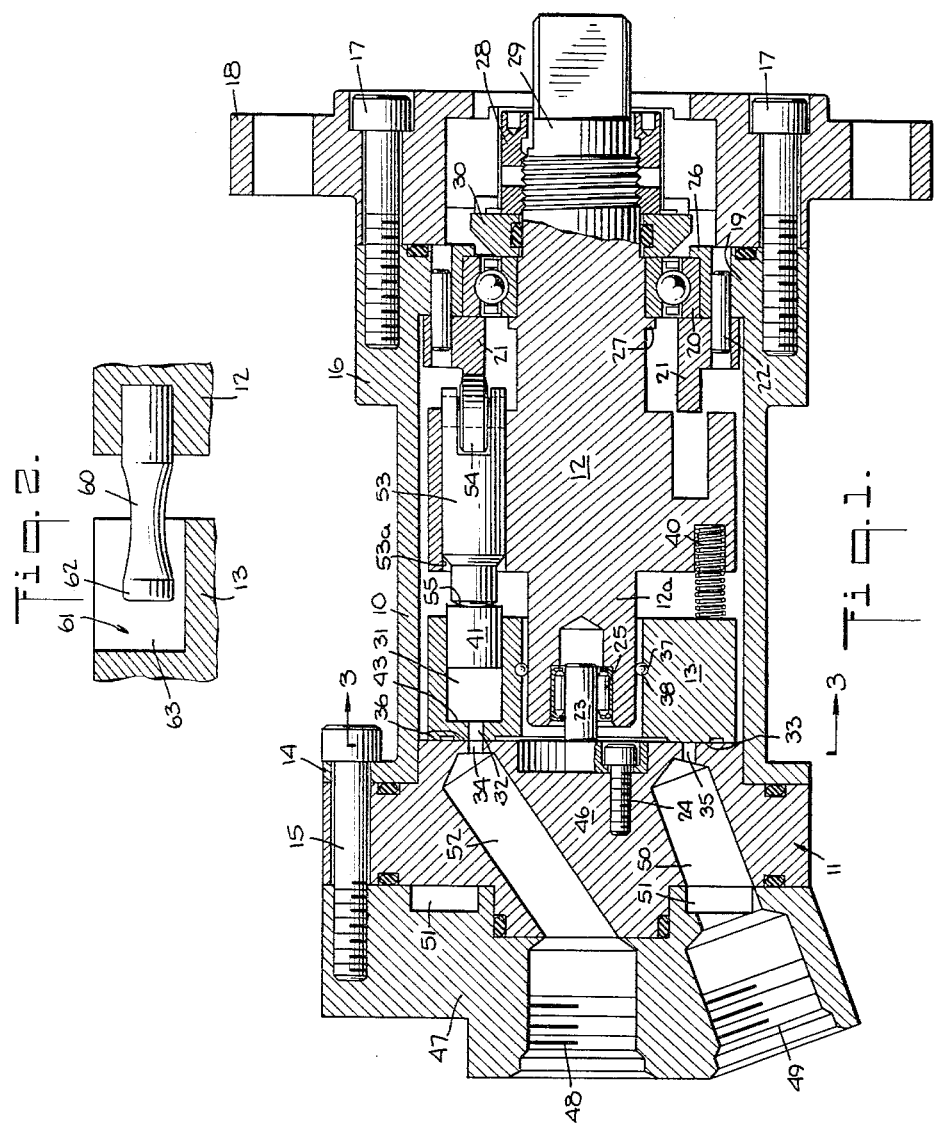

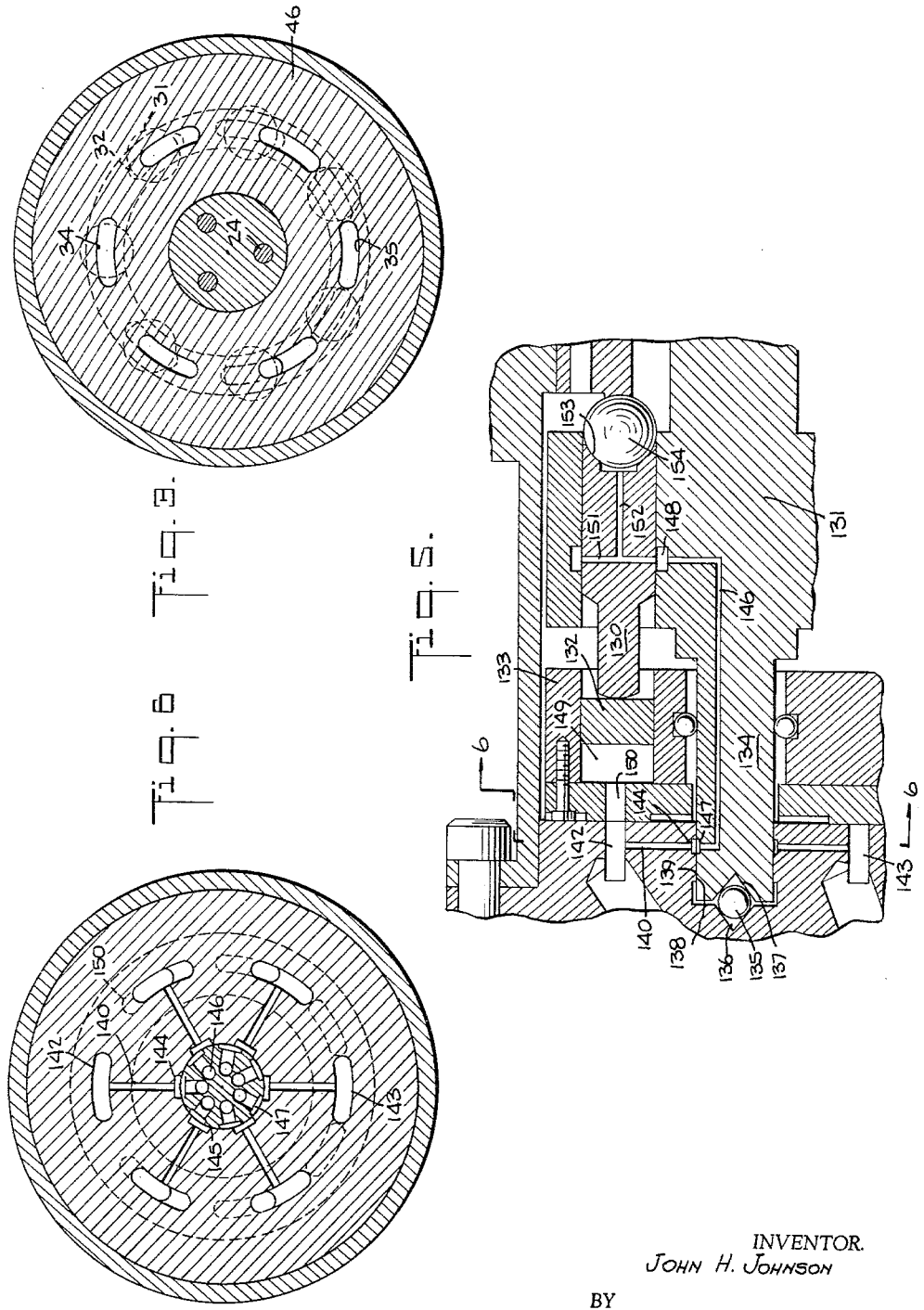

3,228,346
Patented Jan. 11, 1966

3,228,346
HYDRAULIC APPARATUSES
John H. Johnson, Jamestown, N.Y., assignor, by mesne assignments, to TRW Inc., a corporation of Ohio
Filed Feb. 27, 1963, Ser. No. 261,392
4 Claims. (Cl. 103—162)

This invention relates to hydraulic apparatuses and is directed particularly to hydraulic pumps and motors of the axial type. The invention is directed particularly to the mounting of the cylinder block and to the sealing of the inlet and discharge orifices.

An object of this invention is to provide an axial type hydraulic pump or motor with a cylinder block that yields to the fluid pressures to provide a sealing pressure corresponding to the fluid pressure passing through the inlet or discharge orifices.

Another object of the invention is to provide an axial type pump or motor that has a cam follower with a hydrostatically supported bearing ball engaging the cam and the piston or cam follower.

Other and further objects and advantages will be apparent from the following specification taken in connection with the drawings, in which FIG. 1 illustrates an axial unit with an adjustable cylinder block taken along a section through the main axis;

FIG. 2 is a fragmentary sectional view of the coupling between the cylinder block and driving means;

FIG. 3 is a sectional view taken along lines 3—3 of FIG. 1 and diagrammatically illustrates the relation of the inlet and discharge ports and the cylinder block orifices of the embodiment of FIG. 1;

FIG. 5 is a fragmentary sectional view of another embodiment with the cylinder block separate from the drive member; and FIG. 6 is a sectional view taken along line 6—6 of FIG. 5 with the position of the cylinder orifices indicated in dot-dash lines.

Figure 4:
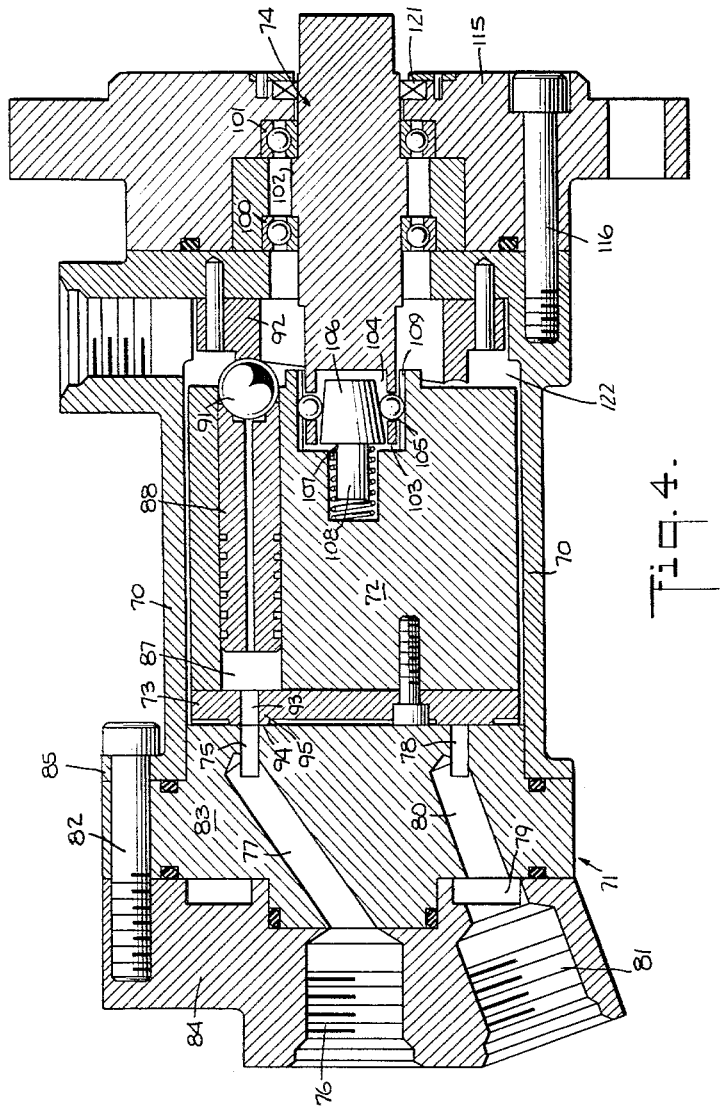
FIG. 4 illustrates an axial unit with an adjustable block taken along a section through the main axis.

Referring to FIG. 1, the axial unit generally comprises a fixed tubular casing 10, an inlet and discharge housing 11, a drive member 12 rotatably mounted therein and a cylinder block 13 rotating with the drive member 12. The casing 10 has an annular flange 14 for securing the inlet and discharge housing to the casing by means of bolts 15 to rigidly fasten the housing 11 to the casing. At the other end of the casing are bosses 16 for receiving the bolts 17 to rigidly secure a mounting flange 18 on the casing. Thus the casing 10, housing 11 and flange 18 form a unitary stationary member. On the inside of casing 10 is the inner flange 19 forming a seat for the roller bearing 20. The cam 21 is also mounted on the flange 19 with the dowels 22 positioning the cam in relation to the inlet and discharge orifices.

The drive member 12 is rotatably mounted on the roller bearing 20 and needle bearing 25. At the valve end the stud 23 is secured to the stationary inlet and discharge housing 11 by the bolts 24 and supports needle bearing 25 and thus the end of the drive member. At the other end, the drive member 12 is supported by the roller bearing 20. The bearing 20 is axially fixed by engaging the cam 21 and the flange 26. The drive member is axially fixed by the flange 27 and nut 28 bearing against the washer 30. The nut is threaded on the coupling shaft 29 protruding from the end of the apparatus.

The cylinder block 13 is circular and has a plurality of cylinder bores 31 circumferentially extending around the axis. In this embodiment seven bores are provided, as illustrated in FIG. 3. Each bore is provided with circumferentially elongated orifice 32 for interchange of fluid with the inlet and discharge housing. A sealing surface 33 extends circumferentially to encompass the orifices and prevent leakage of fluid. The inlet and discharge housing has circumferentially elongated inlet and discharge orifices 34, 35. There are three pairs of inlet and discharge orifices which like the cylinder orifices are slot shaped. The orifices are of approximately the same size and length. A sealing surface 36 encompasses the orifices 34, 35 and is in contacting sealing relation with the surface 33.

The drive member 12 has a reduced portion 12a concentrically fitting into the cylinder block for supporting the cylinder block so that it can rock and tilt about the main axis. An annular groove 37 having a circular or curved surface is formed in the cylinder block. Bearing balls 38 having a slightly less diameter than the groove surface fit in the groove and are circumferentially arranged to support the cylinder block. The balls may be set in the groove and the reduced portion inserted in a manner similar to the assembly of ball bearings.

The cylinder block is held initially against the inlet and discharge block by the springs 40. The springs are arranged circumferentially to provide a balanced initial force.

The pistons 41 in the bores 31 are unconnected to the push rods or cam followers 53 reciprocally and slideably mounted in the drive member. The drive stroke forces the fluid through the discharge orifice in the valve housing. The pressure of the fluid against the wall 43 around the piston orifice 32 provides sealing force pressing the sealing surfaces 33 and 36 together. The cylinder block is mounted on the ring of bearing balls 38 to permit the cylinder block to respond to the unbalance of the forces on the cylinder block by slightly tilting or permitting the pressure to be applied without resistance of the cylinder block. On the inlet or supply stroke the fluid is furnished through the fitting 48 and passages 52 extending to a respective orifice 34 forces the piston 41 against the cam follower 53. The fluid also provides an inlet sealing pressure against the wall 43 to force the sealing surfaces 33 and 36 together.

The inlet and discharge housing 11 is fixed and comprises a valve block 46 and a fittings block 47 for connecting the hydraulic pump to discharge and supply conduits (not shown) by means of the sockets 48, 49. The discharge orifices 35 are connected to passages 50 which are interconnected by an annulus 51 to the socket 49. The supply orifices 34 are connected directly to the socket 48 by passages 52.

The drive member 12 has bores 53a for reciprocally supporting the cam followers 53. The cam followers have rollers 54 rotatably engaging the lobes of cam 21. The piston engaging ends 55 of the cam followers are rounded so as to permit an adjustment of the contact areas to the movement of the pistons and thereby substantially eliminate side loads on the pistons.

The cylinder block 13 is rotated by the drive means 12 through a pin 60 snugly fitting in a slot or groove 61 in the cylinder block. There is relative axial movement permitted between the pin and the walls of the groove to accommodate for the tilting of the cylinder block. Laterally the pin is held firmly so as to maintain the alignment of the cylinder bores and the cam follower bores by the cylindrical surface 62 engaging the planar walls 63 of the grooves.

In the embodiment of FIG. 1 three pairs of inlet and discharge orifices 34 and 35 are provided, which correspond with three lobes on the cam 21 with the minimums and the maximums of the lobes between the inlet and discharge orifices. The cylinder block has seven cylinder bores, each with an orifice communicating with the inlet and discharge orifices on rotation of the cylinder block. Thus the high fluid pressure areas are distributed at uniformly spaced points around the central axis of the hydraulic apparatus so as to provide a generally balancing force around the axis to provide for uniformity of sealing pressure. The greater number of cylinder bores provides a relative movement of the phasing of the orifices 32 and the orifices 34 and 35. Thus during each rotation three strokes are made by each piston. The bearing balls 38 supporting the cylinder block permit the cylinder block to yield to the variations in pressure on rotation.

In FIG. 4 another hydraulic unit is illustrated and comprises a cylindrical casing 70, an inlet and discharge housing 71, a cylinder block 72 with an orfice plate 73 and drive means 74. The inlet and discharge housing is similar to the housing 11 of FIG. 1 with inlet orifices 75 connected to the fitting 76 by passages 77. The discharge orifices 78 are connected to the annulus 79 by passages 80. The fitting 81 is connected to the annulus 79.

The bolts 82 secure the discharge block 83 and fitting block 84 together and fasten the blocks to the flange 85 on the casing 70.

The cylinder block 72 has a plurality of cylinder bores 87 with pistons 88 uniformly arranged around the axis of the motor and extending parallel thereto. Bearing balls 91 are hydrostatically supported on the pistons and ride on the cam 92 to actuate the pistons. The orifice plate 73 is attached to the cylinder block 72 and rotates therewith and has orifices 93 for each bore. The surface 94 on the orifice plate forms a sealing surface pressing against the sealing surface 95 on the discharge block.

The cylinder block 72 is solely supported by the end of the drive means 74. The drive means is rotatably held by the ball bearings 100 and 101. The shoulder 102 engages the inner races of the bearings to hold the drive means against axial movement. The cylinder block has a recess 103 symmetrical to the axis of the block to receive the end of the drive means. The drive means also has a recess 104 and holes 110 with balls 105. The balls are forced radially outwardly by the conically tapered portion 106 of the plug 107. The plug is forced in the recess 104 by the spring 108 fitting in the extension of the recess 103 and pressing against the plug and cylinder block. The recess 103 has longitudinal grooves 109 for receiving the balls 105. The grooves extend parallel to the axis of the cylinder. Power is transmitted between the drive means and cylinder block through the four balls 105 located in radial holes 110 drilled in the other end of the drive means. These balls are aligned with grooves 109. The balls are held in place by the tapered plug, which forces them radially outward due to the action of the spring between the plug and the cylinder block. Driving power is transmitted by a shear force acting on the steel balls 105. This arrangement provides for positive torque transmission and yet allows the drive means and cylinder block to align themselves independently of each other. Because the cylinder block is pressed firmly against the valve plate by the hydraulic force exerted by the pistons, no support other than this ball support is required by the cylinder block. In this particular embodiment recess 103 is cylindrical and concentric to the axis. Four grooves are provided equally spaced around the recess with a ball 105 fitting in each groove.

The drive means 74 and the ball bearing 101 are mounted in an end supporting member 115 which is attached to the casing 70 by the bolts 116. The flange 117 of the casing 70 extends inwardly to support the cam 92 and overlaps with the recess 118 to hold the ring 120 and the bearings 100 and 101 in place. The drive means 74 has a seal 121 recessed in the member 115 sealing chamber 122 and the recess 118.

In FIG. 5 a modification of the embodiment of FIG. 1 providing hydrostatically cam follower balls for engaging the cam lobes is illustrated. The cam followers 130 are mounted in the drive member 131 and the pistons 132 are mounted in a separate cylinder block 133. The drive member has an extension 134 formed as a single piece therewith passing through the center of the cylinder block. The extension is supported in the valve block. A ball 135 fits in seats 136, 137 in the valve block and drive member extension respectively to support the drive member and transmit thrust to the valve block. The valve block has a cylindrical sealing surface 138 engaging in corresponding surface 139 on the extension 134. Passages 140 are provided from the inlet and discharge ports 142, 143 to chambers 144, 145. In the drive member 131 fluid passages 146 are provided extending from the chambers 147 to the annular chambers 148. The seven chambers 147 rotate with the drive member moving into and out of register with the six chambers 144, 145 for receiving fluid pressure from the inlet and discharge ports when the ports are in communication with the cylinder bores 149 through orifices 150. Thus the cylinder bore pressure is transmitted to the annular chambers 148. The sealing surfaces 138, 139 prevent the leakage of fluid from the chambers. The annular chambers extend longitudinally to the cam followers to provide fluid pressure to the passages 151, 152 on the cam followers during the reciprocatory movement of the followers. The latter passages provide the pressure to the spherical seat 153 supporting the ball 154. Thus the cam engaging balls are hydrostatically supported as in the embodiment of FIG. 4.

The foregoing embodiments may be operated as either pumps or motors with the drive member functioning as a means to transmit power to the pistons directly or through cam followers, or as means for receiving power either directly or through the cam followers. In the embodiments of FIGS. 1 and 5 side loads on the pistons are substantially eliminated. In the embodiment of FIG. 4 the combination of the piston with the cam followers as a single piece extends the loading over a long bearing surface to prevent any excessive loading in any particular area.

In each of the embodiments the drive member and cylinder block are adjustably related to permit separate alignment of the members to eliminate the application of lateral loads on the cylinder block. The combining of the cam follower with the drive means eliminates the side loading of the pistons and permits the cylinder block to respond to the sealing pressure forces which are related to the pressure of the fluid contained by the associated cylinder bore. Further in connection with these embodiments, the side loads are also further eliminated by the rolling contact between the cam follower and the piston. Also the drive coupling between the cylinder block and the drive member of the embodiments of FIGS. 1 and 5 has a loose axial and radial motion permitting the free adjustment of the cylinder block. The circumferential tightness of the coupling transmits only the force required to rotate the cylinder block, and does not carry any of the power transmitted. The embodiment of FIG. 5 illustrates the improvement of the embodiment of FIG. 1 in providing the hydrostatically supported cam follower balls in a hydraulic apparatus having a separated cylinder block and cam follower support.

Various other modifications and changes may be made in the foregoing embodiments without departing from the invention as set forth in the appended claims.

I claim:

1. An axial type hydraulic apparatus comprising a stationary casing with a valve block having inlet and discharge ports and a sealing surface encompassing said ports, a cylinder block having longitudinally extending bores with pistons reciprocally mounted therein and a second sealing surface engaging said valve block sealing surface, fluid passing orifices in said cylinder block having radial surfaces facing said pistons for creating sealing pressure, a drive member rotatably supported by said casing, said cylinder block having an inner wall forming a recess with longitudinally extending grooves, said drive member having an end fitting in said recess with a space in the end and radial holes extending through the end to said space, balls in said holes fitting in said grooves and a tapered member mounted in said cylinder block fitting in said space to hold said balls in said grooves thereby supporting said cylinder block on said drive member in a yieldable torque transmitting relation permitting said cylinder block to respond to fluid pressure to maintain the sealing surfaces in fluid tight contact.

2. An axial type hydraulic apparatus comprising a stationary casing with a valve block having inlet and discharge ports and a sealing surface encompassing said ports, a cylindrical block having longitudinally extending bores with pistons reciprocally mounted therein and a second sealing surface engaging said valve block sealing surface, fluid passing orifices in said cylinder block having radial surfaces facing said pistons for creating sealing pressures, a drive member rotatably supported by said casing, said cylinder block and said drive member overlapping and having coupling means within the overlap of said cylinder block and said drive member, said coupling means having rounded means interconnecting said cylinder block and said drive member resiliently held in torque transmitting relation and said rounded interconnecting means tiltably supporting said cylinder block to permit said cylinder block to respond to fluid pressure to maintain the sealing surfaces in fluidtight contact.

3. An axial type hydraulic apparatus as set forth in claim 1 wherein said pistons have spherical seats with bearing balls for engaging a cam and passage means are provided in said pistons for supplying fluid to said spherical seats for hydrostatically supporting said balls with a pressure proportional to the pressure on the piston supporting a respective ball.

4. In an axial type of hydraulic apparatus having a casing with sealing surfaces, a cylinder block with sealing surfaces in contact with the sealing surfaces of said casing and a torque transmitting member in an overlapping relation with said cylinder block; a coupling means within said overlapping relation comprising a plurality of axial grooves in said block, a plurality of balls in said torque transmitting member fitting in said grooves for transmitting torque between said coupling means and said torque transmitting means, means in said overlapping relation having a surface sloped at an angle to the axis and facing said torque transmitting means, and resilient means engaging said block and said sloped surface means for forcing said surface against said balls to support said block on said torque transmitting member in a tiltable torque transmitting relation permitting said cylinder block to respond to fluid pressure for maintaining sealing surfaces in fluidtight contact.

References Cited by the Examiner

UNITED STATES PATENTS

| 2,913,993 | 11/1959 | Toulmin | 103—162 |
| 2,956,845 | 10/1960 | Wahlmark | 103—162 X |

FOREIGN PATENTS

| 1,250,227 | 11/1960 | France. |
| 1,268,698 | 6/1961 | France. |
| | | (corresponding British 906,778, September 1962) |

DONLEY J. STOCKING, *Primary Examiner.*

LAURENCE V. EFNER, ROBERT M. WALKER,
*Examiners.*